US008354806B2

(12) United States Patent
Travis et al.

(10) Patent No.: US 8,354,806 B2
(45) Date of Patent: Jan. 15, 2013

(54) SCANNING COLLIMATION OF LIGHT VIA FLAT PANEL LAMP

(75) Inventors: Adrian Travis, Seattle, WA (US); Timothy Large, Bellevue, WA (US); Neil Emerton, Redmond, WA (US); Steven Bathiche, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 614 days.

(21) Appl. No.: 12/621,275

(22) Filed: Nov. 18, 2009

(65) Prior Publication Data

US 2011/0043142 A1 Feb. 24, 2011

Related U.S. Application Data

(60) Provisional application No. 61/235,928, filed on Aug. 21, 2009.

(51) Int. Cl.
*H05B 39/06* (2006.01)

(52) U.S. Cl. ........ 315/362; 315/313; 362/617; 362/612; 362/330; 362/339

(58) Field of Classification Search .............. 362/617, 362/626, 612, 339, 330, 618, 560, 327, 26, 362/331, 623, 615; 315/313, 362
See application file for complete search history.

(56) References Cited

U.S. PATENT DOCUMENTS

| 4,735,495 A | 4/1988 | Henkes |
| 5,319,455 A | 6/1994 | Hoarty et al. |
| 5,806,955 A | 9/1998 | Parkyn, Jr. et al. |
| 5,808,713 A | 9/1998 | Broer et al. |
| 5,838,403 A | 11/1998 | Jannson et al. |
| 6,072,551 A | 6/2000 | Jannson et al. |
| 6,124,906 A | 9/2000 | Kawada et al. |
| 6,129,444 A | 10/2000 | Tognoni |

(Continued)

FOREIGN PATENT DOCUMENTS

JP   2000106021 A   4/2000

(Continued)

OTHER PUBLICATIONS

Lee, et al., "Flat-panel autostereoscopic view-sequential 3D display backlight", retrieved at << http://www2.eng.cam.ac.uk/~arlt1/04%20Flat-panel%20autostereoscopic%203D%20display%20backlight.pdf>>, Aug. 24, 2009, pp. 4.

(Continued)

*Primary Examiner* — Vibol Tan
(74) *Attorney, Agent, or Firm* — Alleman Hall McCoy Russell & Tuttle LLP

(57) ABSTRACT

Various embodiments are disclosed that relate to scanning the direction of light emitted from optical collimators. For example, one disclosed embodiment provides a system for scanning collimated light, the system comprising an optical wedge, a light injection system, and a controller. The optical wedge comprises a thin end, a thick end opposite the thin end, a viewing surface extending at least partially between the thick end and the thin end, and a back surface opposite the viewing surface. The thick end of the optical wedge further comprises an end reflector comprising a faceted lens structure. The light injection system is configured to inject light into the thin end of the optical wedge, and the controller is configured to control the location along the thin end of the optical wedge at which the light injection system injects light.

20 Claims, 11 Drawing Sheets

U.S. PATENT DOCUMENTS

| | | | |
|---|---|---|---|
| 6,256,447 B1 | 7/2001 | Laine | |
| 6,529,179 B1 | 3/2003 | Hashimoto et al. | |
| 6,648,485 B1 | 11/2003 | Colgan et al. | |
| 6,870,671 B2 | 3/2005 | Travis | |
| 6,895,164 B2 | 5/2005 | Saccomanno | |
| 7,104,679 B2 * | 9/2006 | Shin et al. | 362/626 |
| 7,153,017 B2 * | 12/2006 | Yamashita et al. | 362/606 |
| 7,260,823 B2 | 8/2007 | Schlack et al. | |
| 7,370,342 B2 | 5/2008 | Ismail et al. | |
| 7,375,885 B2 * | 5/2008 | Ijzerman et al. | 359/462 |
| 7,431,489 B2 | 10/2008 | Yeo et al. | |
| 7,503,684 B2 * | 3/2009 | Ueno et al. | 362/620 |
| 7,528,374 B2 | 5/2009 | Smitt et al. | |
| 7,572,045 B2 | 8/2009 | Hoelen et al. | |
| 7,631,327 B2 | 12/2009 | Dempski et al. | |
| 7,844,985 B2 | 11/2010 | Hendricks et al. | |
| 7,957,082 B2 * | 6/2011 | Mi et al. | 359/833 |
| 7,970,246 B2 | 6/2011 | Travis et al. | |
| 8,189,973 B2 | 5/2012 | Travis et al. | |
| 2006/0083004 A1 * | 4/2006 | Cok | 362/330 |
| 2006/0146573 A1 | 7/2006 | Iwauchi et al. | |
| 2006/0215244 A1 | 9/2006 | Yosha et al. | |
| 2007/0201246 A1 | 8/2007 | Yeo et al. | |
| 2007/0274099 A1 | 11/2007 | Tai et al. | |
| 2008/0316768 A1 | 12/2008 | Travis | |
| 2011/0242298 A1 | 10/2011 | Bathiche et al. | |

FOREIGN PATENT DOCUMENTS

| | | | |
|---|---|---|---|
| JP | 2002162912 A | 6/2002 | |
| JP | 2005331565 A | 12/2005 | |
| JP | 2006294361 A | 10/2006 | |
| KR | 20010039013 A | 5/2001 | |
| KR | 20080009490 A | 1/2008 | |
| KR | 20080055051 A | 6/2008 | |
| WO | 2005059874 A1 | 6/2005 | |
| WO | 2006044818 A1 | 4/2006 | |

OTHER PUBLICATIONS

ISA Korea, International Search Report of PCT/US2010/045676, Apr. 28, 2011, WIPO, 2 pages.

ISA Korea, International Search Report of PCT/US2010/046129, Mar. 2, 2011, WIPO, 3 pages.

Yagi, Nobuyuki, Series: The Challenge of "AdapTV"—The Concept of "AdapTV", Retrieved at <<http://www.nhk.or.jp/strl/publica/bt/en/ch0028.pdf>>, 2006, pp. 16-17.

"What is the Pd-net Project About?", Retrieved at <<http://pd-net.org/about/>>, Retrieved Date: Mar. 10, 2011, 3 Pages.

"Real-Time Television Content Platform", Retrieved at <<http://www.accenture.com/us-en/pages/insight-real-time-television-platform.aspx>>, May 28, 2002, 3 Pages.

Travis, et al., "Flat Projection for 3-D ", Retrieved at <<http://ieeexplore.ieee.org/stamp/stamp.jsp?tp=&arnumber=1605201&isnumber=33728>>, Proceedings of the IEEE, vol. 94, No. 3, Mar. 13, 2006, pp. 539-549.

Travis, et al., "Linearity in Flat Panel Wedge Projection", Retrieved at <<http://www2.eng.cam.ac.uk/~arlt1/Linearity%20in%20flat%20panel%20wedge%20projection.pdf>>, SID 03 Digest, May 12, 2005, pp. 716-719.

* cited by examiner

SCANNING COLLIMATION OF LIGHT VIA FLAT PANEL LAMP

CROSS-REFERENCE TO RELATED APPLICATIONS

This application claims priority to U.S. Provisional Application Ser. No. 61/235,928, entitled "SCANNING COLLIMATION OF LIGHT VIA FLAT PANEL LAMP", filed Aug. 21, 2009, the entire disclosure of which is herein incorporated by reference.

BACKGROUND

Many lamps comprise a source of light within a housing that is configured to concentrate the light in a desired direction. For example, in the case of a searchlight or light house, the concentration is such that the light may be said to be collimated, in that rays emerge from the light in parallel. In many cases, it is also desirable that the direction of collimation can be scanned. This may be done with conventional lamps, for example, by rotating the whole lamp, or rotating the lens and mirror around the source of light. However, such scanning mechanisms may not be suitable for use in some devices, such as display devices, due to geometric and other factors.

SUMMARY

Accordingly, various embodiments are disclosed herein that relate to scanning collimated light. For example, one disclosed embodiment provides a system for scanning collimated light, the system comprising an optical wedge, a light injection system configured to inject light into the optical wedge, and a controller. The optical wedge comprises a thin end, a thick end opposite the thin end, a viewing surface extending at least partially between the thick end and the thin end, and a back surface opposite the viewing surface. The thick end of the optical wedge further comprises an end reflector comprising a faceted lens structure. The controller is configured to control the light injection system to control a location along the thin end of the optical wedge at which the light injection system injects light.

This Summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Various embodiments are disclosed herein related to the scanning of collimated light via a flat panel lamp. A flat panel lamp is a panel having a planar surface from which light is emitted. Such lamps may be used, for example, as backlights for liquid crystal display (LCD) panels. Some flat panel lamps may comprise, for example, a plurality of fluorescent light tubes contained within a housing that comprises a diffuser panel through which the light exits the panel. Other flat panel lamps may comprise an optical wedge to deliver light from a light source to a desired destination. An optical wedge is a light guide that permits light input at an edge of the optical wedge to fan out within the optical wedge via total internal reflection before reaching the critical angle for internal reflection and exiting the optical wedge.

Current flat panel lamps are often used as diffuse light sources. However, in some situations, it may be desirable to emit collimated light from a flat panel lamp. For example, in some use environments, it may be desirable to display an image via an LCD panel such that the image may be seen only from certain angles, thereby keeping the displayed information private to intended viewers. The use of collimated light to backlight an LCD panel may allow the construction of such a display, as an image on a display can only be seen if rays of light travel to a viewer's eye from the display.

Further, with such a display, it may desirable that the direction of illumination can be scanned so that the angle at which the image is viewable may be moved. Additionally, if a direction of illumination can be rapidly switched back and forth between a pair of eyes or several pairs of eyes while the image on the liquid crystal panel is switched between one or several pairs of views of a three dimensional object, one can display a three dimensional image. Therefore, embodiments are disclosed herein related to flat panel lamps that emit collimated light and that allow a collimation angle of the light to be scanned. In the accompanying figures, it will be noted that the views of the illustrated embodiments may not be drawn to scale, and the aspect ratios of some features may be exaggerated to make selected features or relationships easier to see.

Figure 1:
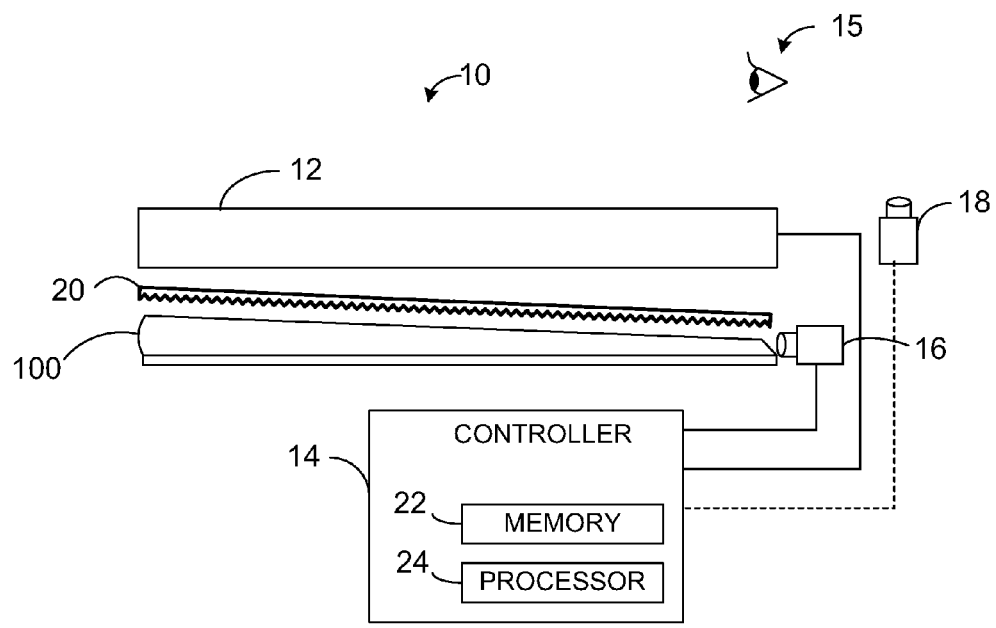
FIG. 1 shows an embodiment of an optical system configured to scan collimated light.

FIG. 1 shows an embodiment of an optical system in the form of a computing device comprising a display configured to output collimated light. Optical system 10 includes spatial light modulator 12 and a collimated light scanning system. Spatial light modulator 12 comprises an array of pixels each of which may be used to modulate light from the backlight with respect to color and intensity. In some embodiments, the spatial light modulator may comprise a liquid-crystal display device, but other light-modulating devices may be used as well. A controller, such as controller 14, may provide display data to spatial light modulator 12. When viewer 15 is in an optical path of the collimated light, and the collimated light has been modulated by spatial light modulator 12 with an image supplied from controller 14, the image may be visible by viewer 15.

Optical system 10 further comprises a light injection system 16, and an optical wedge 100. Some embodiments may further comprise an optional head-tracking camera 18 and light redirector 20 disposed adjacent to a viewing surface of optical wedge 100. As described in more detail below, collimated light is emitted from the viewing surface of optical wedge 100 when light is injected into a thin end of optical wedge 100. The collimated light exits optical wedge 100 with a small angle relative to the plane of the viewing surface of optical wedge 100. Light redirector 20 may be used to redirect the collimated light toward spatial light modulator 12. Any suitable structure may be used as light redirector 20. In some embodiments, light redirector 20 may comprise a film of prisms, for example.

Light injection system 16 may be configured to inject light into one or more locations along the thin end of optical wedge 100. By varying the location where light is injected into the thin end of optical wedge 100, the direction of collimated light leaving the viewing surface of optical wedge 100 may be adjusted.

Figure 13:
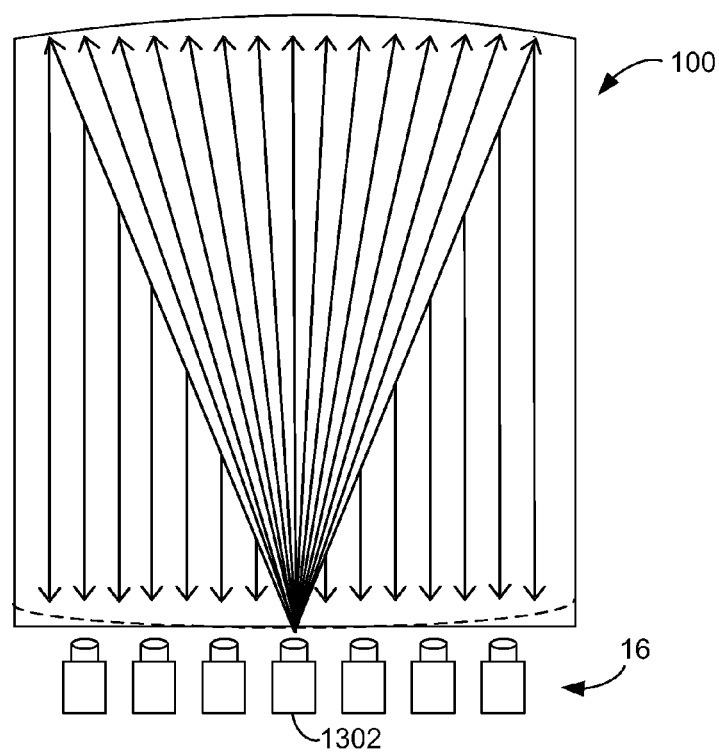
FIG. 13 shows an embodiment of a light injection system comprising a plurality of light sources.
Figure 14:
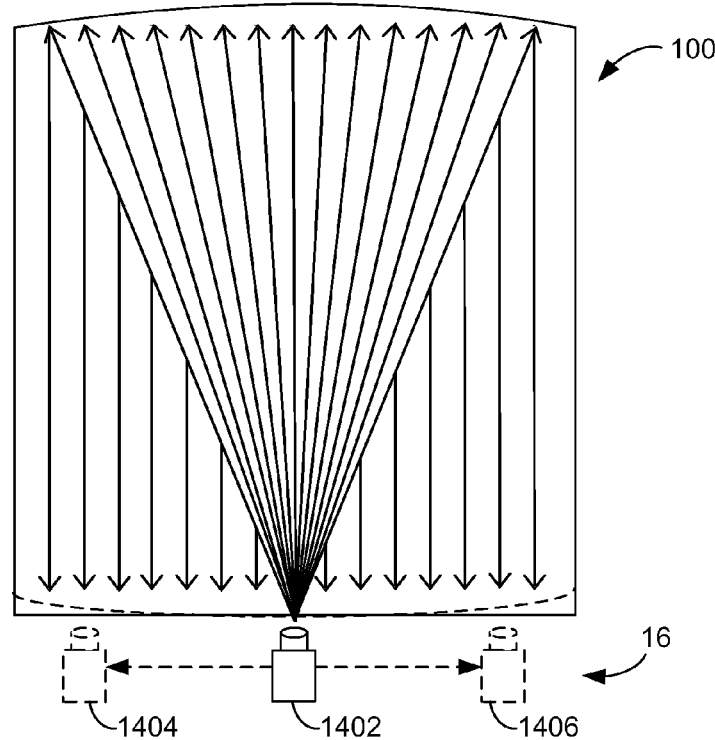
FIG. 14 shows an embodiment of a light injection system comprising a single mechanically scannable light source.
Figure 15:
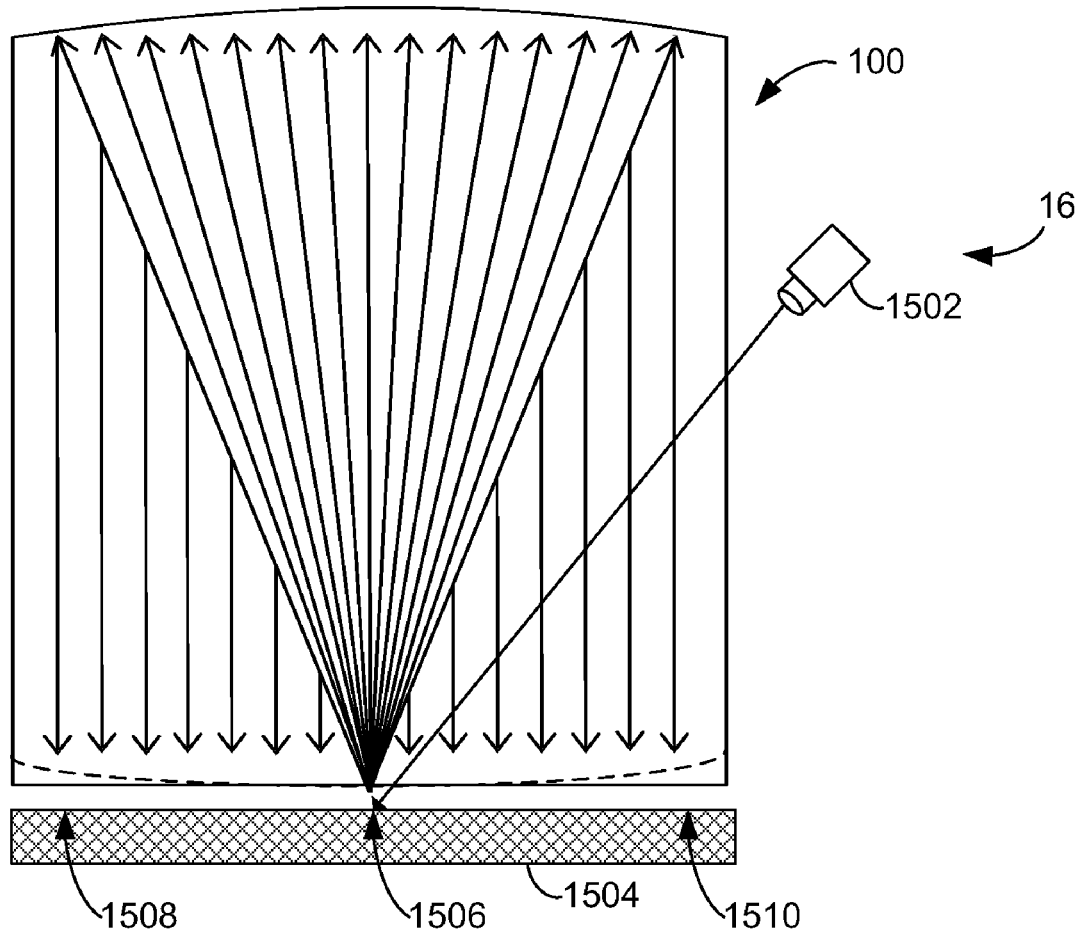
FIG. 15 shows an embodiment of a light injection system comprising an acousto-optic modulator, a laser, and a diffusive screen.

In one example embodiment, illustrated in FIG. 13, light injection system 16 may comprise a plurality of individually controllable light sources, such as light emitting diodes (LEDs) or other suitable light sources, disposed adjacent to the thin end of optical wedge 100. Varying which light source is illuminated, or which light sources are concurrently illuminated, allows control for a direction in which collimated light is emitted from optical wedge 100. For example, a single light source 1302 may be illuminated from the plurality of light sources in FIG. 13. In other embodiments, such as illustrated in FIG. 14, a single mechanically scannable light source 1402 may be used to vary the location along the thin end of the optical wedge at which light is injected. The location of the light source may be varied from one side of optical wedge 100, such as location 1404, to the opposite side of optical wedge 100, such as location 1406. In yet another embodiment, such as illustrated in FIG. 15, light injection system 16 may comprise light source 1502 and diffusive screen 1504. Diffusive screen 1504 is positioned adjacent to and extending along the thin end of optical wedge 100. Light may be injected into the thin end of optical wedge 100 when a laser beam generated by light source 1502 is directed at diffusive screen 1504, and diffuse light is reflected off of diffusive screen 1504 into the thin end of optical wedge 100. Light source 1502 may include a laser and an acousto-optic modulator or a liquid crystal hologram for controlling the direction of the laser beam. The laser beam may be directed at location 1506, as shown, or the laser beam may be scanned from one side of diffusive screen 1504, such as location 1508, to the opposite side of diffusive screen 1504, such as location 1510.

Because the optical wedge 100 is configured to collimate light, injecting light from a single location may enable collimated light to be emitted in a single direction such that a projected image is viewable from only a narrow range of angles. This may allow information to be displayed in a private mode. On the other hand, injecting light from more than one location concurrently may enable collimated light to be emitted in more than one direction, which may allow a projected image to be viewable from a wider range of angles. Such a display mode may be referred to herein as a public mode. It will be understood that these examples of display modes are described for the purpose of illustration, and are not intended to be limiting in any manner.

Returning to FIG. 1, controller 14 may be configured to independently and selectively illuminate each light source of light injection system 16 according to a mode of the system. In such a manner, controller 14 may control the location along the thin end of the optical wedge at which light injection system 16 injects light. In addition, controller 14 may be configured to provide display data to spatial light modulator 12 and to receive data from head-tracking camera 18. The data from head-tracking camera 18 may be analyzed by controller 14 to determine the position of a viewer's head and/or eyes. The data from head-tracking camera 18 may be raw image data or the data may be pre-processed such that various features of the image are extracted before the data is transferred to controller 14. Controller 14 may also determine and store a mode for optical system 10 and control optical system 10 in accordance with that mode. Controller 14 may be any computing device configured to execute instructions that may be stored in a computer readable storage medium, such as memory 22. Processor 24 may be used to execute instructions stored in memory 22, wherein the instructions include routines to carry out control methods for optical system 10.

It will be understood that optical system 10 is described for the purpose of example, and that an optical collimator according to the present disclosure may be used in any suitable use environment. Further, it will be understood that an optical system such as that depicted in the embodiment of FIG. 1 may include various other systems and capabilities not illustrated, including but not limited to a vision-based touch detection system.

Figure 2:
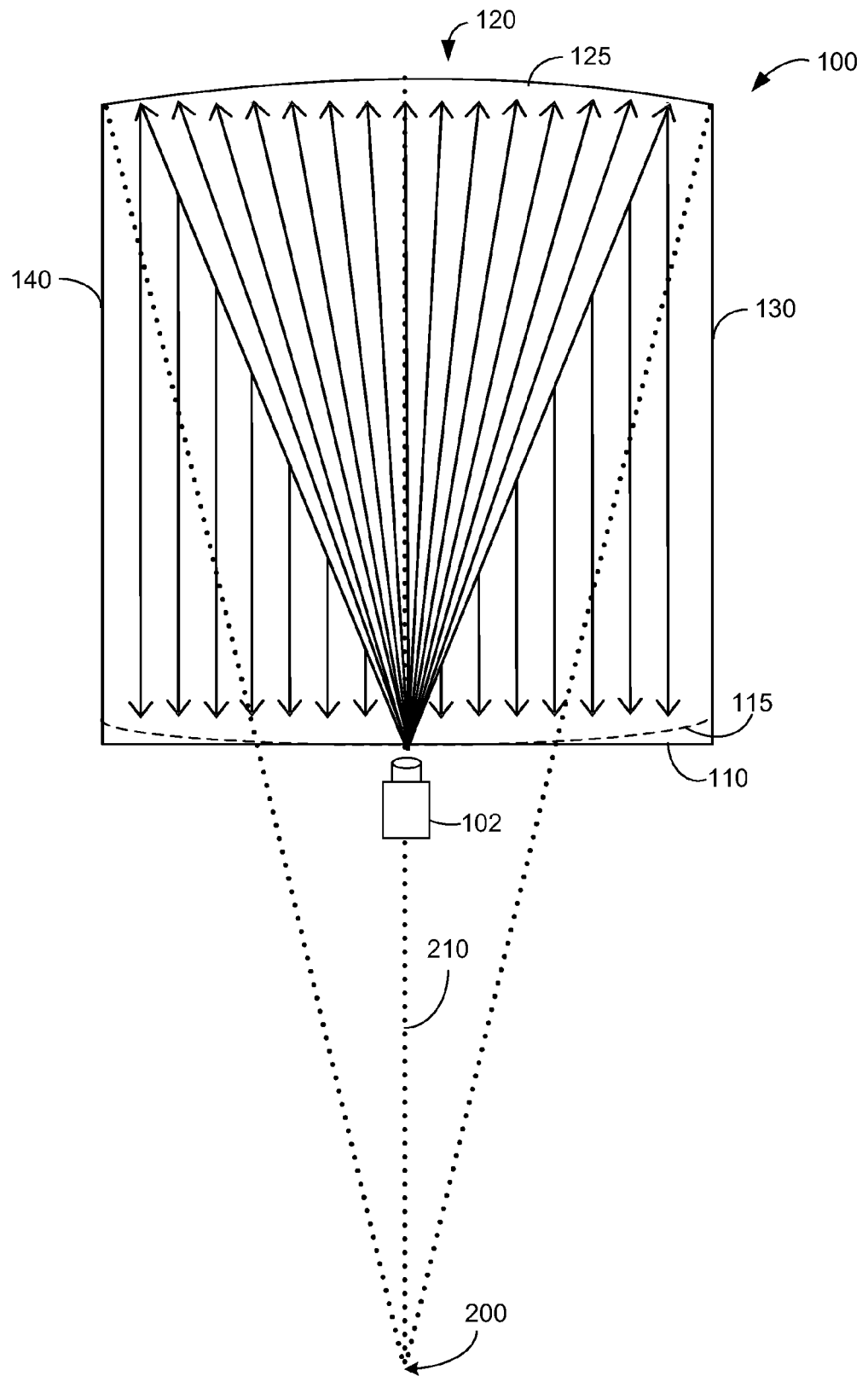
FIG. 2 is a schematic, plan view showing an embodiment of an optical wedge.

Referring next to FIG. 2, optical wedge 100 is configured to collimate light from light source 102 disposed adjacent to a thin end 110 of optical wedge 100, such that collimated light exits viewing surface 150 of optical wedge 100, as shown by the ray traces in FIG. 2. The term "viewing surface" indicates that viewing surface 150 is closer to a viewer than a back surface (not visible in FIG. 2) which is opposite of viewing surface 150. Each of the viewing and back surfaces is bounded by sides 130 and 140, thin end 110, and thick end 120. In FIG. 2, viewing surface 150 faces a viewer of the page and the back surface is hidden by this view of optical wedge 100.

Optical wedge 100 is configured such that light rays injected into a light interface of thin end 110 fan out via total internal reflection as they approach thick end 120 comprising end reflector 125. In the depicted embodiment, end reflector 125 is curved with a uniform radius of curvature having center of curvature 200, and light source 102 injecting light at the focal point of end reflector 125, the focal point being at one half the radius of curvature. At thick end 120, each of the light rays reflects off of end reflector 125 parallel to each of the other light rays. The light rays travel from thick end 120 toward thin end 110 until the light rays intersect viewing surface 150 at a critical angle of reflection of viewing surface 150 and the light rays exit as collimated light. In an alternative embodiment, end reflector 125 may be parabolic or have other suitable curvature for collimating light.

In embodiments that comprise a plurality of light sources disposed adjacent to and along thin end 110, to correct for field curvature and/or spherical aberration, it may be desirable to slightly shorten sides 130 and 140 of optical wedge 100 so that a light source to either side of center line 210 may stay in the focal point of end reflector 125. Shortening sides 130 and 140 may make thin end 110 convex, as illustrated by curve 115. A suitable curvature may be found by using a ray-tracing algorithm to trace rays at a critical angle of reflection of viewing surface 150 of optical wedge 100 back through optical wedge 100 until the rays come to a focus near thin end 110.

Figure 3:
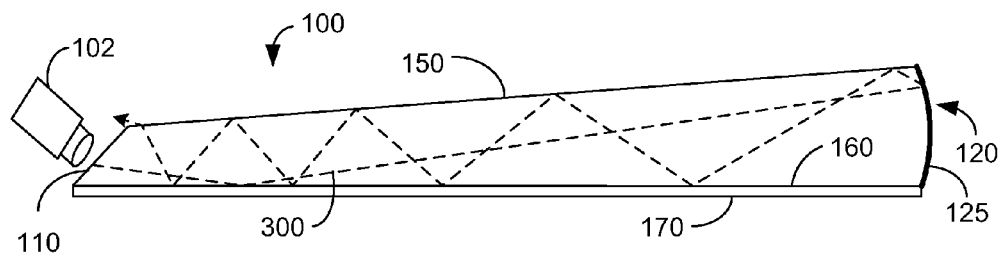
FIGS. 3 and 4 show ray traces through a sectional view of the embodiment of FIG. 2.
Figure 4:
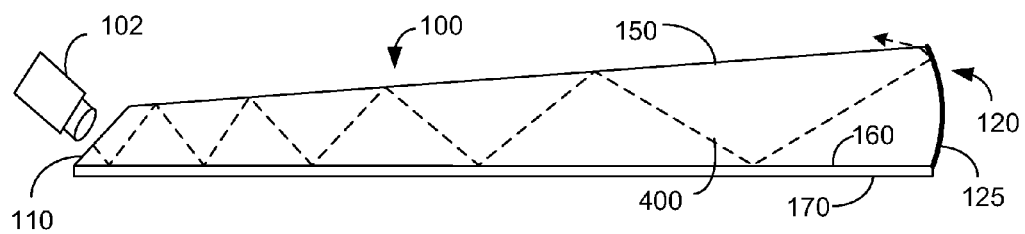

FIGS. 3 and 4 show ray traces through a schematic cross-sectional view of optical wedge 100. FIG. 3 shows the path of a first ray 300 through optical wedge 100, and FIG. 4 shows the path of a second ray 400 through optical wedge 100, wherein rays 300 and 400 represent rays located at opposite sides of a cone of light that is input into thin end 110 of optical wedge 100. As can be seen in FIGS. 3 and 4, ray 300 exits viewing surface 150 adjacent to thin end 110 of optical wedge 100, while ray 400 exits viewing surface 150 adjacent to thick end 120 of optical wedge 100.

Rays 300 and 400 exit viewing surface 150 once the rays 300 and 400 intersect viewing surface 150 at an angle less than or equal to a critical angle of internal reflection with respect to a normal of viewing surface 150. This critical angle may be referred to herein as the "first critical angle." Likewise, rays reflect internally in optical wedge 100 when the rays intersect viewing surface 150 at an angle greater than the first critical angle of internal reflection with respect to the normal of viewing surface 150. Further, rays reflect internally in optical wedge 100 when the rays intersect back surface 160 at an angle greater than a critical angle of internal reflection with respect to the normal of back surface 160. This critical angle may be referred to herein as the "second critical angle."

As explained in more detail below with reference to FIG. 5, it may be desirable for the first critical angle and the second critical angle to be different, such that light incident on back surface 160 at the first critical angle is reflected back toward viewing surface 150. This may help to prevent loss of light through the back surface 160, and therefore may increase the optical efficiency of the optical wedge 100. The first critical angle is a function of the refractive index of optical wedge 100 and the index of refraction of the material interfacing viewing surface 150 (e.g. air or a layer of a cladding), while the second critical angle is a function of the refractive index of optical wedge 100 and the material adjacent to back surface 160. In some embodiments, such as that shown in FIGS. 3-4, a layer of cladding 170 may be applied only to back surface 160, such that viewing surface 150 interfaces with air. In other embodiments, viewing surface 150 may comprise a layer of cladding (not shown) with a different refractive index than back surface 160.

Any suitable material or materials may be used as cladding layers to achieve desired critical angles of internal reflection for the viewing and/or back surfaces of an optical wedge. In an example embodiment, optical wedge 100 is formed from polymethyl methacrylate, or PMMA, with an index of refraction of 1.492. The index of refraction of air is approximately 1.000. As such, the critical angle of a surface with no cladding is approximately 42.1 degrees. Likewise, an example cladding layer may comprise Teflon AF (EI DuPont de Nemours & Co. of Wilmington, Del.), an amorphous fluoropolymer with an index of refraction of 1.33. The critical angle of a PMMA surface clad with Teflon AF is 63.0 degrees. It will be understood that these examples are described for the purpose of illustration, and are not intended to be limiting in any manner.

The configuration of optical wedge 100 and end reflector 125 may be configured to cause a majority of viewing surface 150 to be uniformly illuminated when uniform light is injected into thin end 110, and also to cause a majority of the injected light to exit viewing surface 150. As mentioned above, optical wedge 100 is tapered along its length such that rays injected at thin end 110 are transmitted to end reflector 125 via total internal reflection. End reflector 125 comprises a faceted lens structure configured to decrease the ray angle relative to a normal to each of viewing surface 150 and back surface 160. In addition, the diminishing thickness of optical wedge 100 from thick end 120 to thin end 110 causes ray angles to diminish relative to the normal of each surface as rays travel toward thin end 110. When a ray is incident on viewing surface 150 at less than the first critical angle, the ray will exit viewing surface 150.

In some embodiments, light source 102 may be positioned at a focal point of end reflector 125. In such embodiments, end reflector 125 may be curved with a radius of curvature that is twice the length of optical wedge 100. In the embodiment of FIGS. 3-4, the taper angle of optical wedge 100 is configured so that the corner at thick end 120 and viewing surface 150 comprises a right angle and the corner at thick end 120 and back surface 160 comprises a right angle. When thin end 110 is at the focal point of end reflector 125, thin end 110 is one half the thickness of thick end 120. In other embodiments, each of these structures may have any other suitable configuration.

In the depicted embodiment, end reflector 125 is spherically curved from side 130 to side 140 and from viewing surface 150 to back surface 160. In other embodiments, end reflector 125 may be cylindrically curved with a uniform radius of curvature from viewing surface 150 and back surface 160 and a center of curvature where viewing surface 150 and back surface 160 would meet if extended. A cylindrically curved end reflector may resist sag more strongly than a spherically curved end reflector 125, which may be beneficial in large format applications. Other suitable curvatures may be used for end reflector 125, such as parabolic, for example. Additionally, the curvature of end reflector 125 in the plane perpendicular to sides 130 and 140 may differ from the curvature of end reflector 125 in the plane parallel to sides 130 and 140.

As mentioned above, it may be desirable for the critical angles of reflection of viewing surface 150 and back surface 160 to be different to help prevent loss of light through back surface 160. This is illustrated in FIG. 5, which shows a schematic, magnified cross-sectional view of end reflector 125 of the embodiment of the optical wedge in FIGS. 2-4. End reflector 125 comprises a faceted lens structure comprising a plurality of facets arranged at an angle relative to a surface of thick end 120. The plurality of facets alternate between facets facing viewing surface 150, such as facet 530, and facets facing back surface 160, such as facet 540. End reflector 125 conforms to a general curvature as described above, with end reflector normal 542 and end reflector normal 532 extending toward the center of curvature. Each of the plurality of facets has a height and an angle relative to a normal of a surface of the end reflector. For example, one of the facets facing viewing surface 150 has a height 538 and an angle 536 relative to end reflector normal 532 and facet normal 534. As another example, one of the facets facing back surface 160 has a height 548 and an angle 546 relative to end reflector normal 542 and facet normal 544.

The height of each of the plurality of facets may affect the uniformity and the brightness of collimated light exiting viewing surface 150. For example, larger facets may create optical paths that differ from the ideal focal length, which may cause Fresnel banding. As such, in embodiments where such banding may pose issues, it may be desirable to make the height of each of the plurality of facets less than 500 microns, for example, so that such banding is less visible.

Likewise, the angle of each of the plurality of facets also may affect the uniformity and brightness of collimated light exiting viewing surface 150. Ray 500 illustrates how facet angles may affect the path of a ray through optical wedge 100. Ray 500 is injected into thin end 110, travel through optical wedge 100 and strikes end reflector 125. Half of ray 500 strikes facet 530 facing viewing surface 150. The portion of ray 500 striking facet 530 is reflected as ray 510 toward viewing surface 150. Ray 510 intersects viewing surface 150 at an angle less than or equal to the first critical angle of internal reflection with respect to a normal of viewing surface 150, and thus exits the viewing surface 150 as ray 512.

The other half of ray 500 strikes facet 540 facing back surface 160. The portion of ray 500 striking facet 540 is reflected as ray 520 toward back surface 160. Because of the difference between the critical angles of viewing surface 150 and back surface 160, ray 520 intersects back surface 160 at an angle greater than the second critical angle of internal reflection with respect to a normal of back surface 160, and thus reflects as ray 522 toward viewing surface 150. Ray 522 then intersects viewing surface 150 at an angle less than or equal to the first critical angle of internal reflection with respect to a normal of viewing surface 150, and thus exits as ray 524. In this manner, a majority (and in some embodiments, substantially all) of the light that reflects from end reflector 125 exits viewing surface 150.

Due to light being separately reflected by facets facing viewing surface 150 and facets facing back surface 160, overlapping, superimposed first and second images arranged in a head-to-tail orientation are formed at viewing surface 150 when light is reflected from the back surface to exit the viewing surface. The degree of overlap between these images may be determined by the angles of the facets 530 and 540. For example, the two images are completely overlapping when each facet has an angle relative to a normal of a surface of the end reflector of three-eighths of a difference between ninety degrees and the first critical angle of reflection, as explained in more detail below. In this instance, substantially all light input into optical wedge 100 exits the viewing surface 150. Varying the facets from this value decreases the amount of overlap between images, such that only one or the other of the two images is displayed where the angles of the facets are ¼ or ½ of the difference between 90 degrees and the first critical angle of reflection. Further, varying the angles of the facets from three-eighths of the difference between ninety degrees and the first critical angle of reflection also causes some light to exit from the thin end of optical wedge 100, rather than from viewing surface 150. Where the angles of the facets are ¼ or ½ of the difference between 90 degrees and the first critical angle of reflection, the viewing surface also may be uniformly illuminated, but half of the light exits from the thin end of optical wedge 100, and is therefore lost. It will be understood that, depending upon the desired use environment, it may be suitable to use facet angles other than three-eighths of the difference between ninety degrees and the first critical angle of reflection to produce collimated light. Such use environments may include, but are not limited to, environments in which any regions of non-overlapping light (which would appear to have a lower intensity relative to the overlapping regions) are not within a field of view observed by a user, as well as environments where diminished light intensity is acceptable.

In an alternative embodiment, the faceted lens structure of end reflector 125 may comprise a diffraction grating. The grating equation may be used to calculate an angle of diffraction for a given angle of incidence and a given wavelength of light. Since the angle of diffraction is dependent on the wavelength of the light, an end reflector comprising a diffraction grating may be desirable when the injected light is monochromatic.

Figure 7:
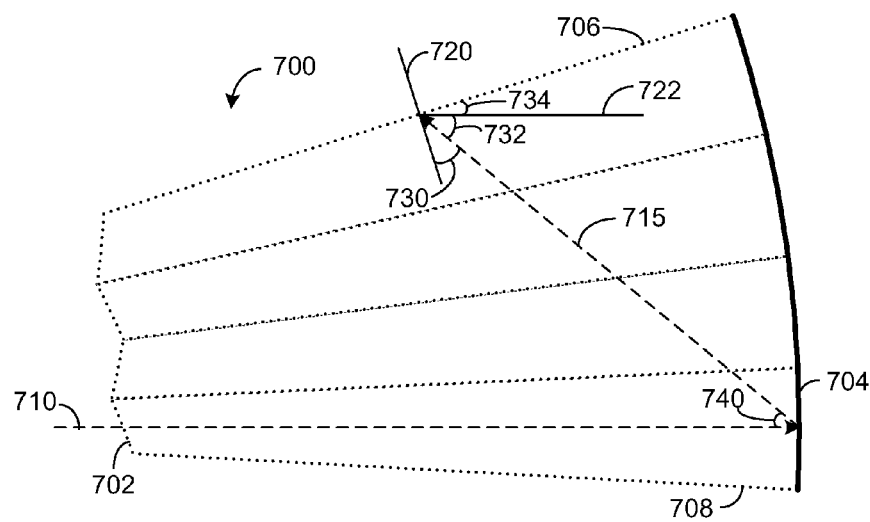
FIGS. 6 and 7 show ray traces through the embodiment of FIG. 2 as paths through a stack of replicates of the embodiment of FIG. 2.
Figure 5:
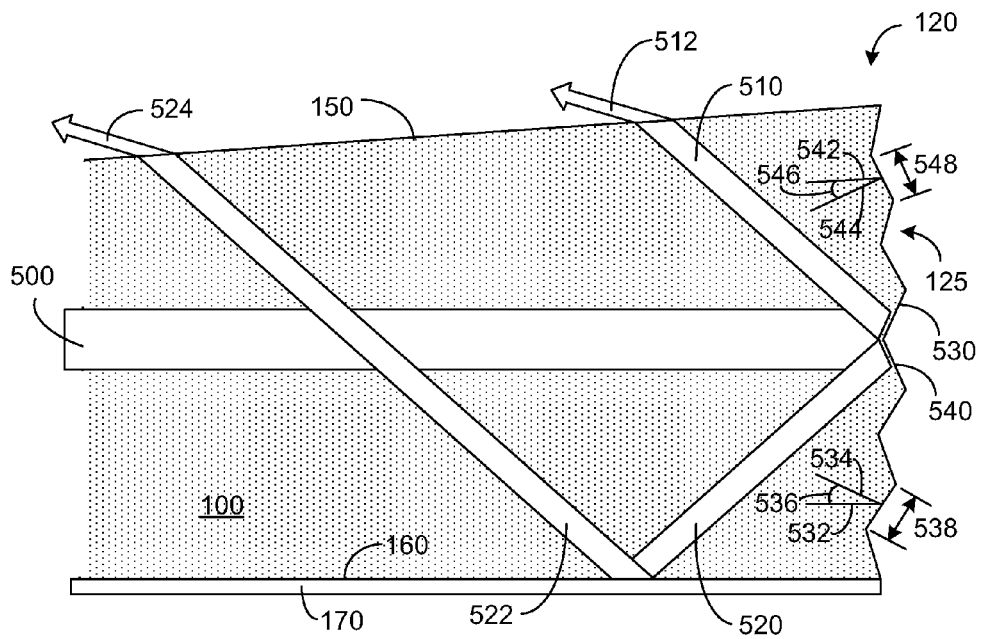
FIG. 5 shows a schematic, magnified cross-sectional view of an end reflector of the embodiment of FIG. 2.
Figure 6:
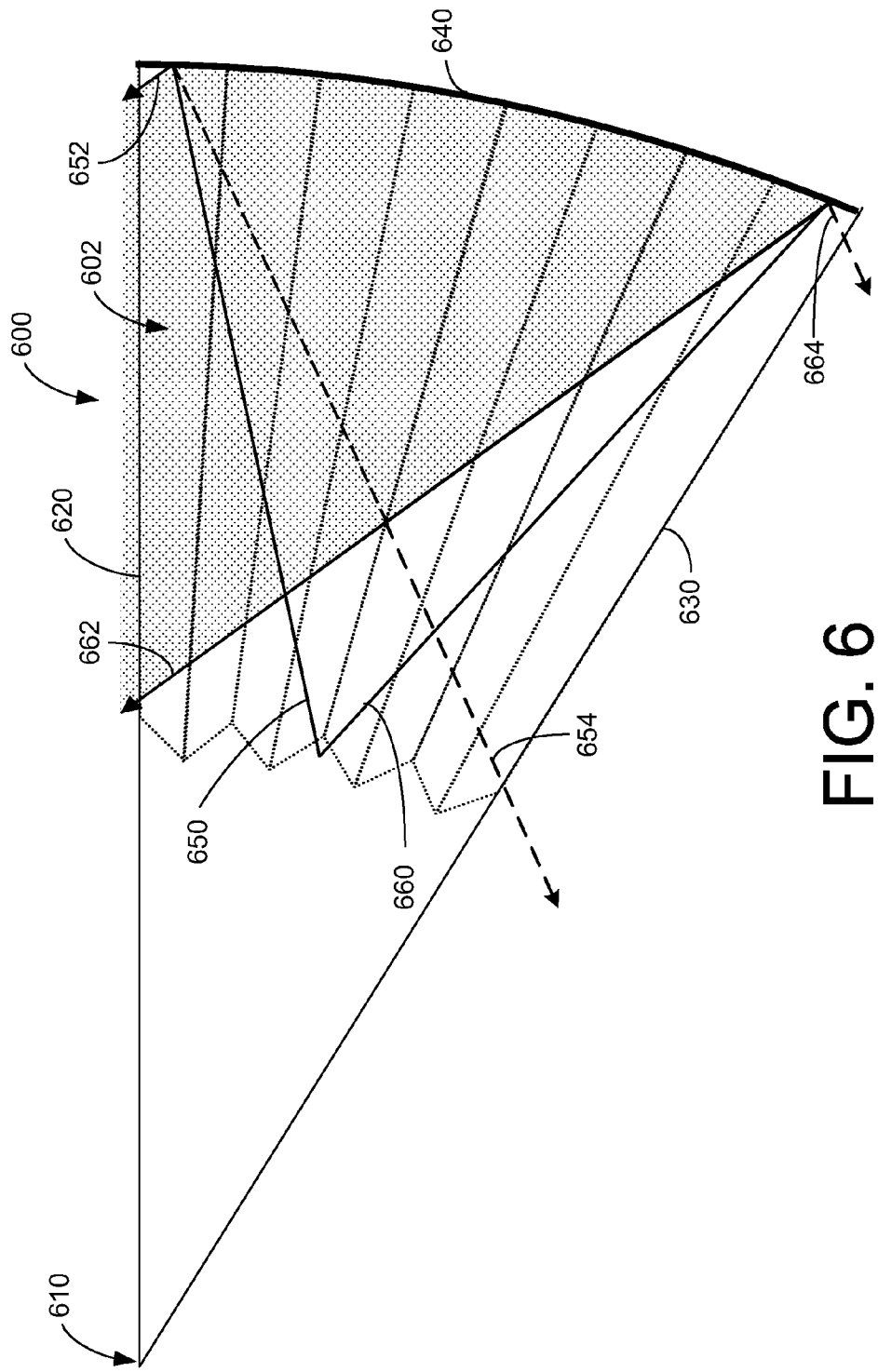

FIGS. 6 and 7 illustrate the travel of light through optical wedge 100 as paths of rays through a stack of optical wedges, each optical wedge being a replicate of the embodiment of optical wedge 100 to further illustrate the concepts shown in FIG. 5. Tracing rays through a stack of replicates of an optical wedge is optically equivalent to tracing a ray's path within an optical wedge. Thus, in this manner, each internal reflection of a ray is shown as the passage of the ray through a boundary from one optical wedge to an adjacent optical wedge. In FIG. 6, the viewing surface is shown as viewing surface 620 of a topmost wedge in the stack of optical wedges 600. The back surface is shown as back surface 630 of a bottommost wedge in the stack of optical wedges 600. The thick ends of the stack of optical wedges 600 join to form what is approximately a curve 640 centered on the axis 610 where all the surfaces converge.

FIG. 6 also depicts two rays of light 650 and 660 located at opposite sides of a cone of light that is injected into a thin end of the optical wedge stack 600. For each ray 650 and 660, after reflection from the end reflector, half of the ray emerges near the thick end of the optical wedge stack 600 (and hence from the represented optical wedge), as shown by solid lines 652 and 662, and half of the ray emerges from the thin end of the optical wedge stack, as shown by dashed lines 654 and 664. Rays injected at any angle between these two extremes will also be split by the faceted pattern in the end reflector, and emerge from the viewing surface and back surface of the optical wedge in a similar manner. The rays exiting viewing surface 620 parallel to rays 652 and 662 are represented by shaded area 602. As mentioned above, it will be understood that rays shown as being emitted through back surface 630 of the optical wedge may instead be reflected by the back surface and then out of the viewing surface by utilizing a cladding (not shown) on the back surface of the optical wedge that has a lower refractive index than a cladding (not shown) utilized on a viewing surface of the optical wedge. In this manner, substantially all light that is injected into the thin end of such an optical wedge may be emitted from the viewing surface of the optical wedge.

For the viewing surface to be uniformly illuminated (e.g. where the images reflected from facets 530 and 540 are fully overlapping), a ray injected at the thin end and travelling horizontally toward the end reflector, coincident with a normal of the end reflector, reflects off of a facet facing the viewing surface and travels to the center of the viewing surface, intersecting the viewing surface at the critical angle of the viewing surface. FIG. 7 shows a schematic depiction of a path of such a ray through a stack of optical wedges 700. Ray 710 is injected at thin end 702 of the optical wedge and reflects off end reflector 704 as ray 715. Ray 715 travels to the center of viewing surface 706, intersecting viewing surface 706 at critical angle of reflection 730 relative to viewing surface normal 720. The sum of angles 732 and 734 is the difference of 90 degrees and critical angle of reflection 730. When the thin end of the optical wedge is one half the thickness of the thick end of the optical wedge, the center point of the wedge is three-fourths the thickness of the optical wedge. Using a paraxial approximation, angle 732 is three-fourths of the difference of 90 degrees and critical angle of reflection 730. Horizontal line 722 is parallel to injected ray 710 so angle 740 is equal to angle 732. From the law of reflection, the angle of incidence is equal to the angle of reflection so the facet angle may be one half of angle 740. Therefore, for the viewing surface to be uniformly illuminated, each facet facing the viewing surface may form an angle relative to a normal of a surface of the end reflector of three-eighths of a difference between 90 degrees and critical angle of reflection 730, as mentioned above.

Figure 8:
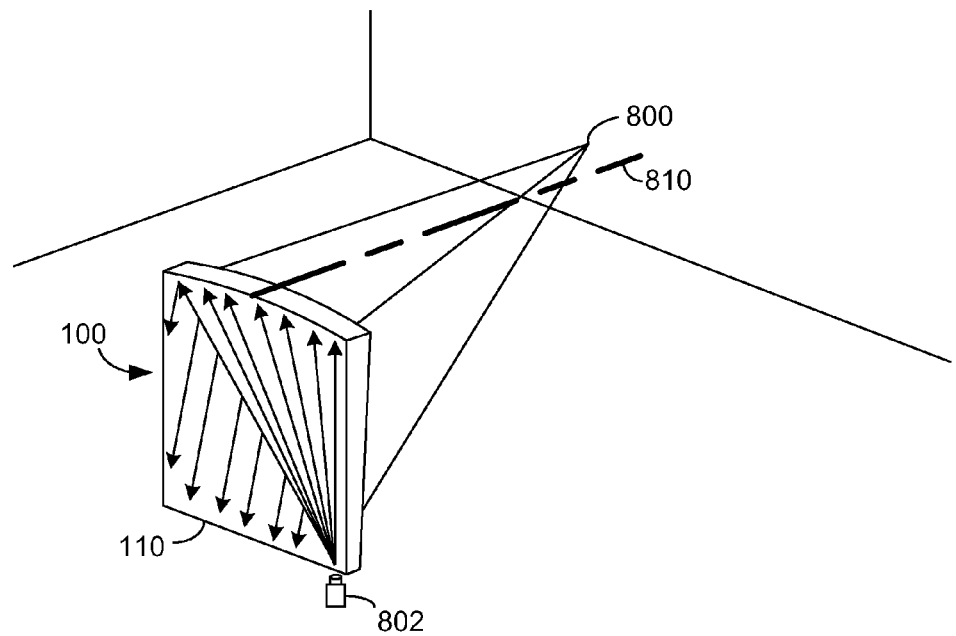
FIGS. 8 and 9 illustrate the scanning of collimated light by injection of light into the optical wedge of FIG. 2 at different locations along a thin end of the optical wedge.
Figure 9:
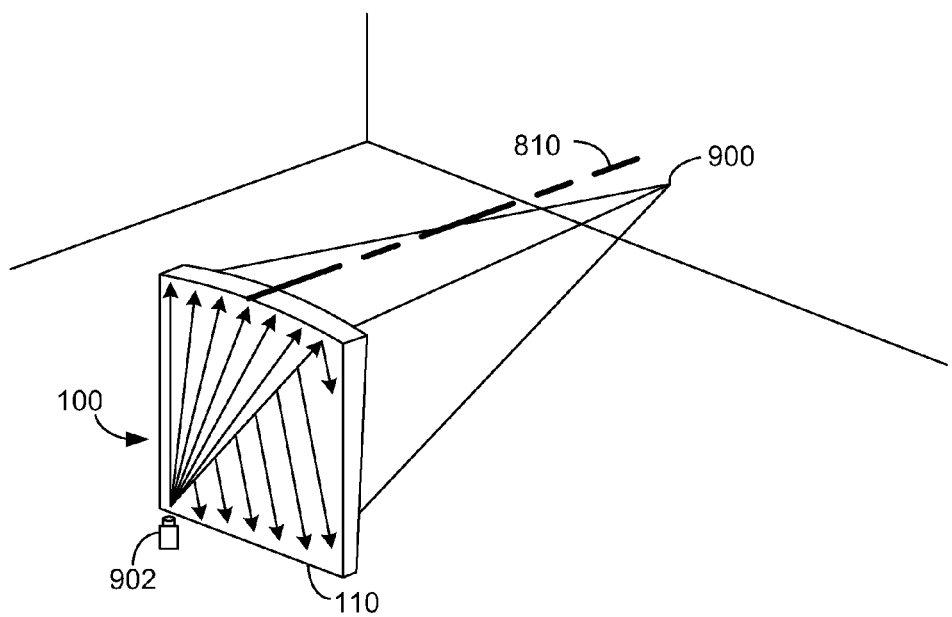

FIGS. 8 and 9 show how a direction of collimated light may be varied by injecting light into the optical wedge of FIG. 2 at different locations along the thin end of the optical wedge. Specifically, the direction of collimation may be moved to the left by shifting the location of light injection to the right, and vice versa. In each figure, the visible position of a single pixel of collimated light, shown respectively at 800 and 900 in FIGS. 8 and 9, is illustrated for clarity. Further, lines are shown tracing from the point of light to the corners of the light interface of the optical wedge and centerline 810 is shown to illustrate movement of the pixel of light with respect to the optical wedge more clearly as the light injection location is moved.

In FIG. 8, light is injected from light source 802 at a first location into the right side of thin end 110. The direction of the collimated light is directed toward the left of centerline 810 as illustrated by the pixel at visible position 800. In FIG. 9, light is injected from light source 902 at a second location into the left side of thin end 110. The direction of the collimated light is directed to the right of centerline 810 as illustrated by the pixel at visible position 900. It will be understood that collimated light may be scanned, smoothly or in steps of any desired size, by changing the location of light injection along the thin side of optical wedge 100 at a desired distance interval. Such a display mode may be referred to herein as a scanning mode.

Figure 10:
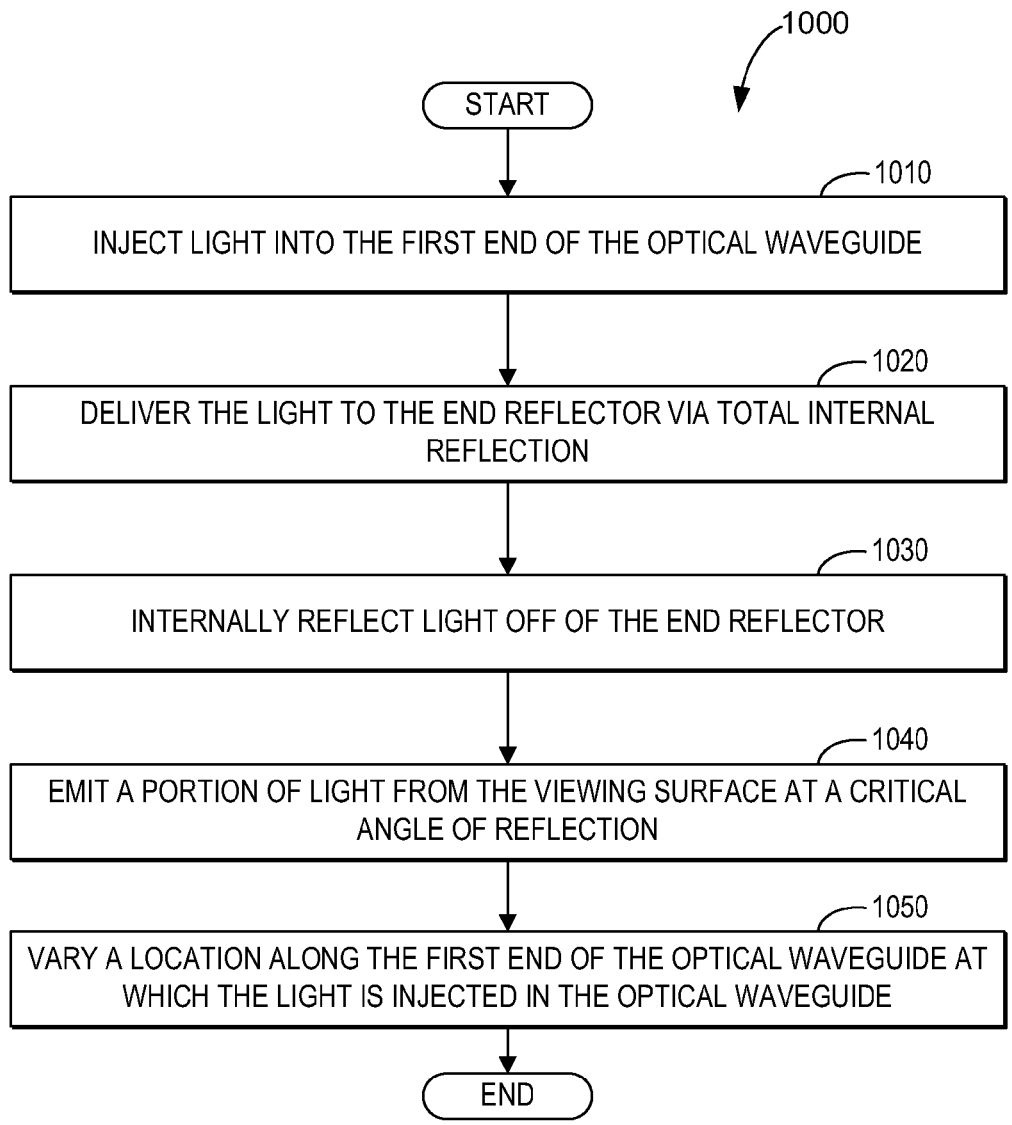
FIG. 10 shows a flowchart illustrating an embodiment of a method of scanning collimated light.

FIG. 10 shows a flowchart of an example method of scanning collimating light via an optical waveguide. The optical waveguide may comprise a first end, a second end opposite the first end and comprising an end reflector, a viewing surface extending between the first end and the second end, and a back surface opposing the viewing surface. In one embodiment, the optical waveguide is the optical wedge of FIG. 2, where the thin end of the optical wedge is the first end of the optical waveguide and the thick end of the optical wedge is the second end of the optical waveguide. In an alternate embodiment, the optical waveguide may have a constant thickness, e.g. the first end and the second end are the same thickness. The optical waveguide may include a cladding on the viewing and/or back surface with a refractive index that varies linearly between the first end and the second end. This embodiment will behave similarly to an optical wedge when light is injected into the first end of the optical waveguide. In yet another embodiment, the optical waveguide may have a constant thickness, a refractive index that varies linearly between the first end and the second end, and claddings on the viewing and/or back surface of constant refractive index. This embodiment will also behave similarly to an optical wedge when light is injected into the first end of the optical waveguide.

Returning to FIG. 10, method 1000 begins at 1010, by injecting light into the first end of the optical waveguide. As described above, the light may be injected by a light source configured to be mechanically moved along the first end of the optical waveguide, for example. In another embodiment, a plurality of light sources may be arranged along the first end of the optical waveguide, each light source configured to inject light into the first end of the optical waveguide at a different location along the first end of the optical waveguide. The light may injected by one or more light sources of the plurality of light sources. In yet another embodiment, the light may be injected by scanning a laser beam across a diffusive screen positioned adjacent to and extending along the first end of the optical waveguide.

Next, at 1020, the injected light is delivered to the end reflector via total internal reflection. At 1030, the light may be internally reflected off of the end reflector. The light internally reflected off of the end reflector may be reflected from a first set of facets and a second set of facets, each of the first set of facets having a normal that points at least partially toward the viewing surface, and each of the second set of facets having a normal that points at least partially toward the back surface. Furthermore, in some embodiments, each of the first set of facets may have an angle of three-eighths of a difference between 90 degrees and the critical angle of reflection and each of the second set of facets may have an angle of three-eighths of the difference between 90 degrees and the critical angle of reflection. In other embodiments, the facets may have other suitable angles that do not cause unsuitable variations in light intensities. In yet another embodiment, the end reflector may include a diffraction grating.

Due to the angle at which facets on the end reflector are angled, at 1040, a portion of light may be emitted from the viewing surface, the portion of light intersecting the viewing surface at a critical angle of reflection. Next, at 1050, the location along the first end of the optical waveguide at which the light is injected into the optical waveguide may be varied. In one embodiment, the location along the first end of the optical waveguide may be varied by mechanically moving a light source to a desired location and then light may be injected at the desired location by the light source. In another embodiment, the location along the first end of the optical waveguide may be varied by selectively illuminating a light source from a plurality of light sources arranged along the first end of the optical waveguide. In yet another embodiment, the location along the first end of the optical waveguide may be varied by scanning a laser across a diffusive screen positioned adjacent to and extending along the first end of the optical waveguide. By varying the location where light is injected, the direction of the collimated light may be varied. As illustrated in FIGS. 8 and 9, injecting light into the left side of thin end 110 of optical wedge 100 may emit collimated light in a direction to the right of optical wedge 100, and vice versa.

Figure 11:
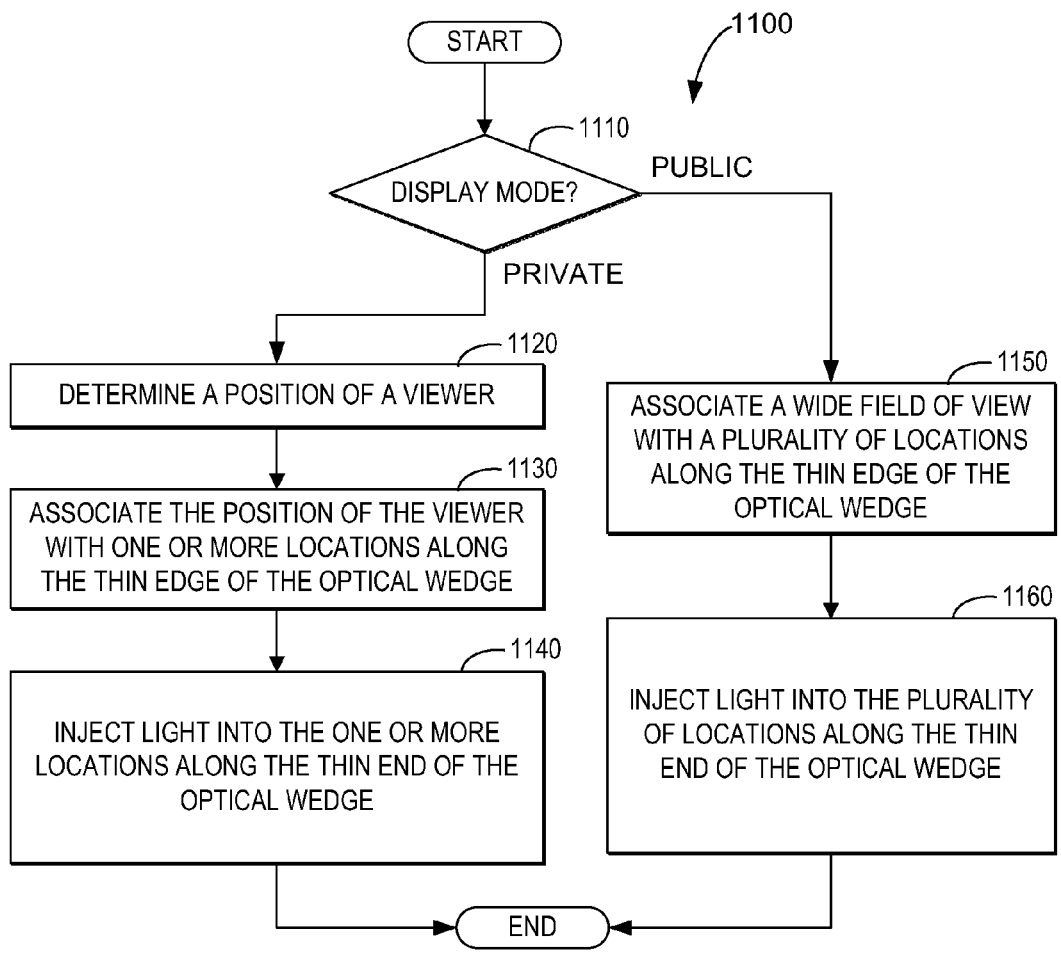
FIG. 11 shows a flowchart illustrating an embodiment of a method of using collimated light to display public and private information using different modes on a display device.
Figure 12:
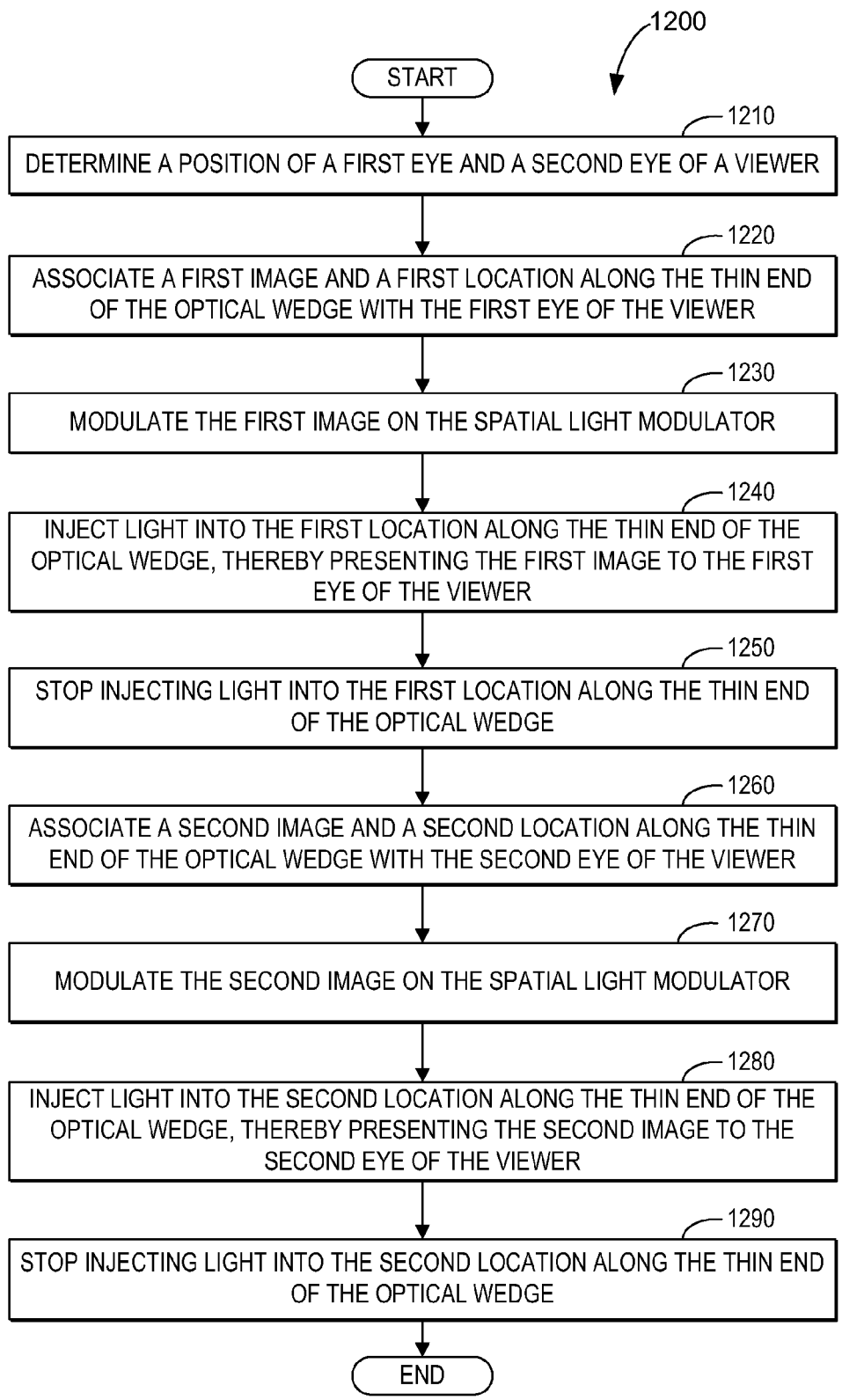
FIG. 12 shows a flowchart illustrating an embodiment of a method for using collimated light to display autostereoscopic images.
Figure 16:
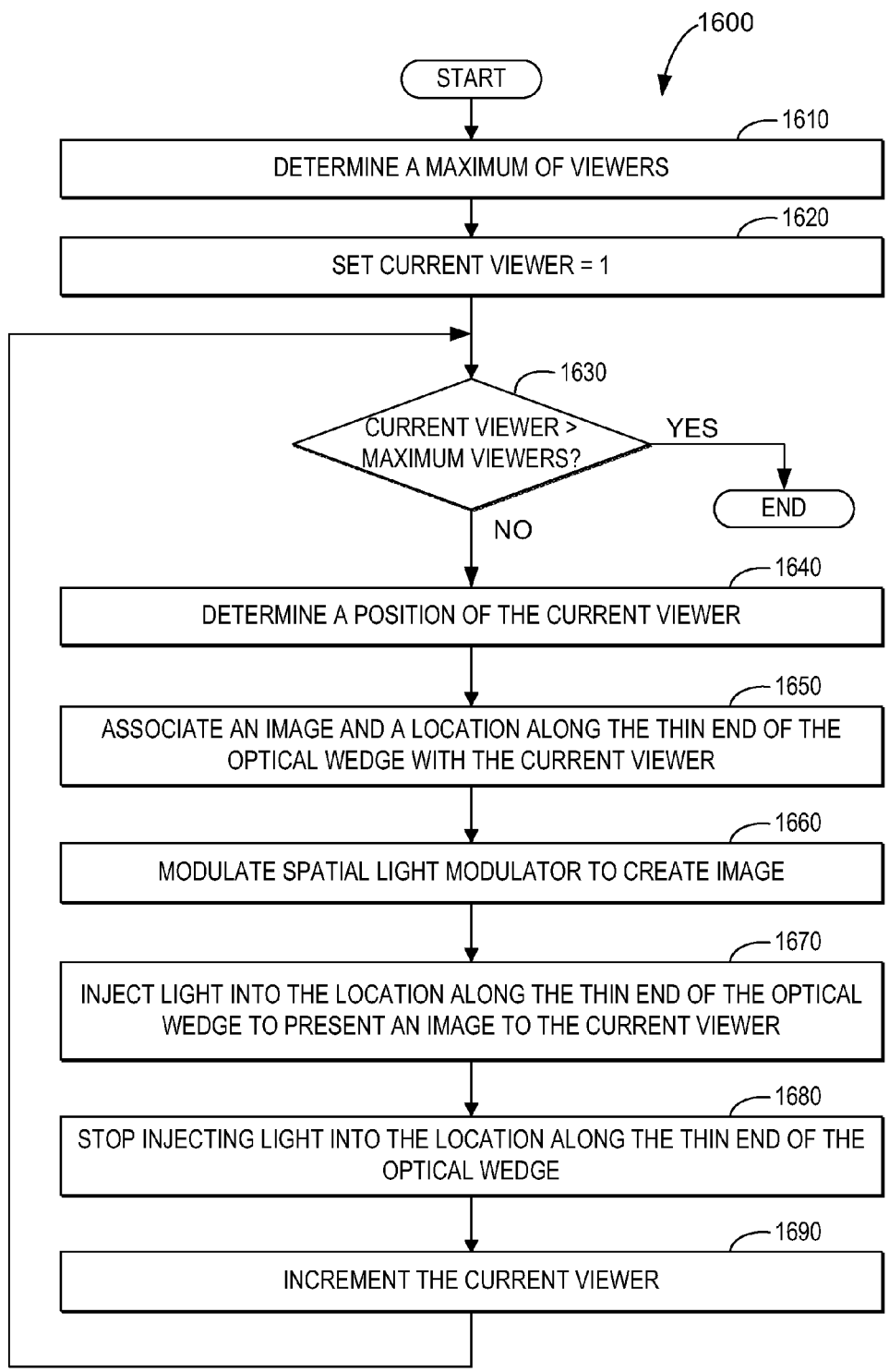
FIG. 16 shows a flowchart illustrating an embodiment of a method of using collimated light to display different images to different viewers concurrently.

FIG. 11 shows a flowchart of an example routine that may be used to carry out a method of using collimated light to display public and private information during different modes on the same optical system, such as optical system 10. Prior to describing FIG. 11, it will be understood that the use of the term "wedge" in the descriptions of FIGS. 11-12 and 16 are not intended to limit applicability of this embodiment to optical wedge lightguides, and that a lightguide with a varying index of refraction, as described above, also may be used.

Returning to FIG. 11, at 1110, the display mode of the optical device is determined. If the display mode is a public mode, the routine proceeds from 1110 to 1150. If the display mode is a private mode, the routine proceeds to 1120.

When the display mode is private, at 1120, a position of a viewer may be determined. The position of the viewer may be determined by controller 14 using head-tracking data received from head-tracking camera 18 or the position may be assumed to be directly in front of optical system 10, for example. At 1130, the position of the viewer may be associated with one or more locations along the thin end of the optical wedge. The locations along the thin end of the optical wedge may be selected such that the viewer is in an optical path of collimated light emitted from optical system 10 when light is injected at each of the locations, for example. At 1140, light may be injected into the one or more locations along the thin end of the optical wedge. Injecting light at a single location from a single light source may provide the narrowest field of view of optical system 10. However, it may be desirable to widen the field of view by injecting light at more than one location. Widening the field of view may provide margin if the calculated position of the viewer is not exact, such as if the head-tracking algorithm is slow compared to a speed of a viewer's movements, for example. It will be understood that the field of view may be controllable by a user of the display such that a private image may be displayed to any number of users located in any suitable position(s) around the display. The routine ends after 1140.

Method 1100 may be continually repeated in a loop such that the position of the viewer may be updated if the viewer moves. By updating the position of the viewer and the associated location along the thin end of optical wedge, the collimated light from optical system 10 may follow the viewer as the viewer moves.

When the display mode is public, at 1150, a wide field of view may be associated with a plurality of locations along the thin end of the optical wedge. For example, in some situations, all of the light sources may be illuminated concurrently, or a sub-set of light sources may be illuminated concurrently. In either case, as illustrated at 1160, light is injected into the plurality of locations along the thin end of the optical wedge and an image may be displayed with a wide field of view.

The public mode of the display may be used in different manners to display an image to different numbers of viewers. For example, it may be desirable to display an image to any viewer that may have a direct view of the display screen. In this case, a wide field of view may be obtained by illuminating all light sources of a plurality of light sources arranged along the thin end of an optical wedge. On the other hand, some uses of the public mode may exhibit certain characteristics of a private display. For example, the display may be configured such that a bank teller and a customer may each see an image that may be concealed to viewers with a different angle of the display than the bank teller or the customer. In such a mode, the directions which to direct the collimated light may be predetermined based upon a seating/standing position of intended viewers, or may be determined by camera or other suitable method.

FIG. 16 shows a flowchart illustrating another embodiment that utilizes collimated light to display private images (either the same or different images) to multiple viewers concurrently. Method 1600 begins at 1610, where a maximum number of viewers are determined. At 1620, the current viewer is set to the first viewer. At 1630, the current viewer number and the maximum number of viewers are compared. If the current viewer number exceeds the maximum number of viewers, the routine will end. If the current viewer number is less than or equal to the maximum number of viewers, the routine may continue at 1640.

At 1640, a position of the current viewer is determined. The position may be determined by using head-tracking data, the position may be pre-determined (e.g. a number of and/or locations of positions may be controlled and/or set by a user or administrator) etc. At 1650, an image is associated with the current viewer. The image may also be associated with other viewers so that multiple viewers may see the same image. A location along thin end 110 of optical wedge 100 may also be associated with the current viewer at 1650. The location along thin end 110 may be selected so that the current viewer will be in an optical path of collimated light emitted by optical system 10 when light is injected at the location along thin end 100 of the optical wedge 100. At 1660, the image may be modulated on spatial light modulator 12. At 1670, light injection system 16 may be used to inject light into thin end 110 of optical wedge 100, thereby presenting the image to the current viewer. At 1680, the injection of light into thin end 110 of optical wedge 100 is stopped. At 1690, the current viewer number is incremented and then the method continues at 1630.

Method 1600 may be placed in a loop and repeated such that one or more images may be presented to one or more viewers concurrently. If the routine is repeated fast enough, e.g. the refresh rate is high enough, a viewer's eyes may integrate the time-multiplexed images associated with that viewer into a flicker-free image. Each viewer has different perceptions, but refresh rates greater than 60 Hz may be desirable.

FIG. 12 shows a flowchart of an example routine used to carry out a method of displaying autostereoscopic images via collimated light. Such a display mode may be referred to herein as an autostereoscopic mode. At 1210, a position of a first eye and a position of a second eye of a viewer are determined. At 1220, a first image and a first location along the thin end of the optical wedge are associated with the first eye of the viewer. The first image may be a view of a three-dimensional object as seen by the left eye of the viewer, for example. The left eye may be in the optical path of collimated light emitted by optical system 10 when light is injected at the first location along the thin end of the optical wedge. At 1230, the first image is modulated on spatial light modulator 12 and at 1240, light is injected into the first location along the thin end of the optical wedge, thereby presenting the first image to the first eye of the user.

At 1250, the injection of light into the first location along the thin end of the optical wedge is stopped, and at 1260, a second image and a second location along the thin end of the optical wedge are associated with the second eye of the viewer. The second image may be a view of a three-dimensional object as seen by the right eye of the viewer, for example. The right eye may be in the optical path of collimated light emitted by optical system 10 when light is injected at the second location along the thin end of the optical wedge, for example. At 1270, the second image may be modulated on spatial light modulator 12. At 1280, light may be injected into the second location along the thin end of the optical wedge, thereby presenting the second image to the second eye of the user.

At 1290, the injection of light into the second location along the thin end of the optical wedge is stopped. Method 1200 may then be repeated such that a first set of images are displayed to one eye and a second set of images are displayed to the other eye. If the routine is repeated fast enough, e.g. the refresh rate is high enough, the viewer's eyes may integrate the time-multiplexed images into a flicker-free scene. Each viewer has different perceptions, but refresh rates greater than 60 Hz may be desirable.

The three-dimensional effect may be heightened when the viewer can move her head and see the image change accordingly. To create this effect, a plurality of laterally adjacent images may be displayed in quick succession so that each image is visible from a slightly different viewing angle. For example, in one embodiment, the plurality of laterally adjacent images may include 32 images representing 32 views of a three-dimensional scene. Since each eye of the viewer views the display at a slightly different angle, each eye may see a different image and the scene appears three-dimensional. In addition, multiple viewers may also see a three-dimensional image when each of their eyes is presented with a different image.

For the viewer to see an image, the light from the image should converge at the viewer's eye. Optical system 10 in FIG. 1 may enable autostereoscopic viewing when the spatial light modulator 12 is small, e.g. pupil sized. As the size of spatial light modulator 12 increases, optical system 10 may comprise additional optical elements, such as a Fresnel lens adjacent to spatial light modulator 12.

It will be appreciated that the computing devices described herein may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable storage media may be provided having program instructions stored thereon, which upon execution by a computing device, cause the computing device to execute the methods described above and cause operation of the systems described above.

It will be understood that the specific configurations and/or approaches described herein for scanning collimated light are presented for the purpose of example, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A system for scanning collimated light, the system comprising:
   an optical waveguide comprising:
      a first end,
      a second end opposite the first end,
      a viewing surface extending at least partially between the first end and the second end,
      a back surface opposite the viewing surface, and
      a collimating end reflector disposed at the second end of the optical waveguide;
   a light injection system configured to inject light into the first end of the optical waveguide; and
   a controller configured to control a location along the first end of the optical waveguide at which the light injection system injects light.

2. The system of claim 1, wherein the light injection system comprises a plurality of light sources arranged along the first end of the optical waveguide, each light source configured to inject light into the first end of the optical waveguide at a different location along the first end of the optical waveguide.

3. The system of claim 2, wherein the controller is configured to concurrently illuminate two or more light sources of the plurality of light sources to display an image along more than one direction.

4. The system of claim 2, wherein the controller is configured to illuminate one light source of the plurality of light sources to display an image along one direction.

5. The system of claim 2, wherein the controller is configured to consecutively illuminate the plurality of light sources to display an autostereoscopic image.

6. The system of claim 2, further comprising a head-tracking camera and wherein the controller is further configured to receive data from the head-tracking camera and to create head-tracking data.

7. The system of claim 6, wherein the system further comprises two or more selectable modes comprising a private mode and a public mode, the private mode for directing collimated light toward a single viewer, the public mode for directing collimated light toward more than one viewer; and
   wherein the controller is further configured to illuminate one or more light sources of the plurality of light sources according to the mode of the system and the head-tracking data.

8. The system of claim 2, wherein the controller is further configured to consecutively illuminate the plurality of light sources to display one or more images to one or more viewers.

9. The system of claim 1, wherein the light injection system comprises a diffusive screen arranged along the first end of the optical waveguide and a light source configured to generate a laser beam that is scanned along the diffusive screen.

10. The system of claim 1, further comprising a light redirector disposed adjacent to the viewing surface and configured to receive light from the viewing surface and redirect the light received from the viewing surface.

11. A system for scanning collimated light, the system comprising:
   an optical wedge comprising:
      a thin end,
      a thick end disposed opposite the thin end,
      a viewing surface extending at least partially between the thin end and the thick end, the viewing surface comprising a first critical angle of reflection relative to a direction normal to the viewing surface,
      a back surface disposed opposite the viewing surface and comprising a second critical angle of reflection relative to a direction normal to the back surface, wherein the second critical angle is less than the first critical angle, and
      an end reflector disposed at the thick end of the optical wedge, the end reflector having a faceted lens structure configured to reflect internally transmitted incident light that travels along an optical path between the thin end and the viewing surface;
   a plurality of light sources arranged along the thin end of the optical wedge, each light source being configured to inject light into the thin end of the optical wedge; and
   a controller configured to independently and selectively illuminate each light source of the plurality of light sources according to a mode of the system.

12. The system of claim 11, wherein the mode of the system comprises one or more of a private mode, a public mode, an autostereoscopic mode, and a scanning mode.

13. The system of claim 11, further comprising a camera, and wherein the controller is further configured to receive image data from the camera and to create head-tracking data from the image data.

14. The system of claim 13, wherein the controller is further configured to illuminate one light source of the plurality of light sources according to head-tracking data when in a private mode, whereby collimated light is directed toward a head of a single viewer.

15. The system of claim 13, wherein the controller is further configured to alternately illuminate a first light source and a second light source of the plurality of light sources according to head-tracking data when in an autostereoscopic mode, whereby collimated light from the first light source is directed toward a first eye of a viewer and collimated light from the second light source is directed toward a second eye of the viewer.

16. The system of claim 11, wherein the controller is further configured to illuminate one or more light sources of the plurality of light sources when in a public mode.

17. The system of claim 11, further comprising:
a light redirector disposed adjacent to the viewing surface and configured to receive light from the viewing surface and redirect the light received from the viewing surface.

18. A method of scanning collimating light via an optical waveguide, the optical waveguide comprising a first end, a second end opposite the first end and comprising an collimating end reflector, a viewing surface extending between the first end and the second end, and a back surface opposing the viewing surface, the method comprising:
injecting light into the first end of the optical waveguide;
delivering the light to the end reflector via total internal reflection;
internally reflecting the light off of the collimating end reflector;
emitting a first portion of light from the viewing surface at a critical angle of reflection;
internally reflecting a second portion of light from the back surface at an angle equal to the critical angle of reflection, and then emitting the second portion of light from the viewing surface after internally reflecting the second portion of light from the back surface; and
varying a location along the first end of the optical waveguide at which light is injected into the optical waveguide.

19. The method of claim 18, wherein injecting light into the first end comprises injecting light from a light source configured to generate a laser beam that is scanned along a diffusive screen arranged along the first end of the optical waveguide, and wherein varying a location along the first end of the optical waveguide at which the light is injected into the optical waveguide comprises scanning the laser beam along the diffusive screen.

20. The method of claim 18, wherein injecting light into the first end comprises injecting light from a plurality of light sources, and wherein varying a location along the first end of the optical waveguide at which the light is injected into the optical waveguide comprises selectively illuminating a light source from the plurality of light sources.

* * * * *